Figure 1:
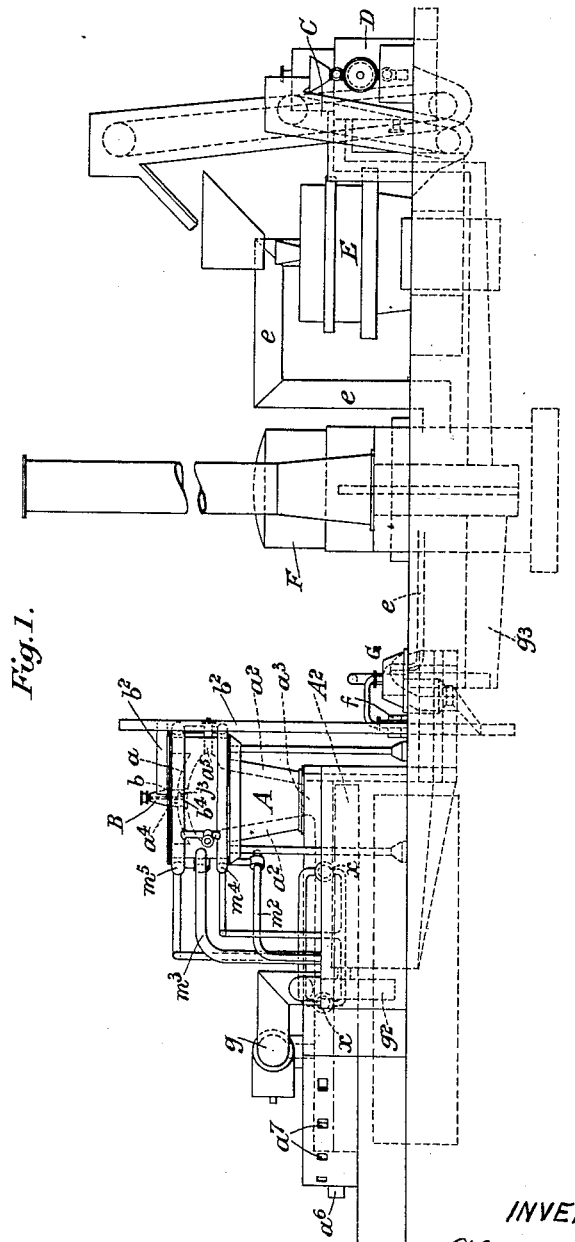

A. FERGUSON.
METHOD AND APPARATUS FOR THE MANUFACTURE OF GLASS.
APPLICATION FILED SEPT. 7, 1920.

1,371,084.

Patented Mar. 8, 1921.
7 SHEETS—SHEET 1.

UNITED STATES PATENT OFFICE.

ALEXANDER FERGUSON, OF SCORRIER, ENGLAND, ASSIGNOR TO FRANCIS WILLIAM PASSMORE, OF LONDON, ENGLAND.

METHOD AND APPARATUS FOR THE MANUFACTURE OF GLASS.

1,371,084.   Specification of Letters Patent.   Patented Mar. 8, 1921.

Application filed September 7, 1920. Serial No. 408,623.

*To all whom it may concern:*

Be it known that I, ALEXANDER FERGUSON, a subject of the King of Great Britain, residing at Tolgullow House, Scorrier, in the county of Cornwall, England, have invented new and useful Methods and Apparatus for the Manufacture of Glass, of which the following is a specification.

My invention has for its object to manufacture glass in such manner that I obtain not only great economy in the fuel necessary for attaining the requisite temperature but also the better production of glass of an improved character.

For the purposes of my invention I employ, as a melting chamber, a furnace of the kind hereinafter described, which has before been proposed for use in connection with the recovery of volatile metals from refractory minerals and I combine with a glass-making tank which may also be of a kind which has before been employed, in glass making. Therefore my present invention consists neither in the principle of the structure of such furnace, broadly considered, or in itself alone nor in the structure of the tank itself, but in the combination of the two in the one plant as hereinafter explained and their conjoint operation also as hereinafter explained to provide an improved process of making glass. The mixture of gas, with the requisite quantity of air by the combustion of which mixture the heat for melting the glass-making materials is obtained, is admitted to, and burnt in, the enlarged upper part of the aforesaid melting chamber, which, as in the case of the aforesaid furnace, decreases downward in cross-sectional area and is preferably of trumpet-, or funnel-, shape, with curved walls and with a dome-shaped top through which the glass-making materials are passed, the said mixture of gas, and air on ignition and combustion being forcibly injected under the requisite pressure, so that the gases due to combustion pass in a tangential direction and impart a whirling motion to the particles of the glass-making materials which are thus distributed in the large space beneath the said top and subjected very efficiently to the temperature due to the expanding gases. The distribution of glass-making materials in the expanding gases permits the particles having affinity for each other to readily combine, the slag, or glass, formed passing, under centrifugal force, onto and afterward down, the inwardly curved, or inclined, walls of the melting chamber, and thence into the aforesaid lower portion, or tank, with which in the combination according to my invention the lower contracted end of the melting chamber communicates, the combustion gases also passing from the melting chamber, downward into the said lower portion, or tank, to refine and finish (or assist in refining and finishing) the glass which has passed from the melting chamber, or tank, above.

The molten glass thus refined and finished can flow from the said lower portion, or tank, to the usual, or any suitable, working holes, or compartments, according to the way in which the glass is to be worked.

The gases, by the combustion of which, with the necessary air, the necessary heat for glass-making is obtained may be of any suitable kind and be derived from any suitable source. If the fuel from which the heat is obtained be of a bituminous character it may be subjected to heat in a retort wherein it is fractionally distilled, the lighter product, or products, of distillation being, if desired, taken off separately for use, or sale, and the heavier portions being charged into a gas-producer.

If desired the gas, from the producer, before being admitted to the glass-making part of the apparatus, may be preheated in regenerators, or recuperators.

It will be understood that neither the furnace which I use as a melting chamber, nor the tank, are by themselves of my present invention, but only parts of a combined plant for carrying out my improved glass-making process and as adapted for that particular purpose.

I will describe, with reference to the accompanying drawings, how my invention can be performed.

Figure 2:
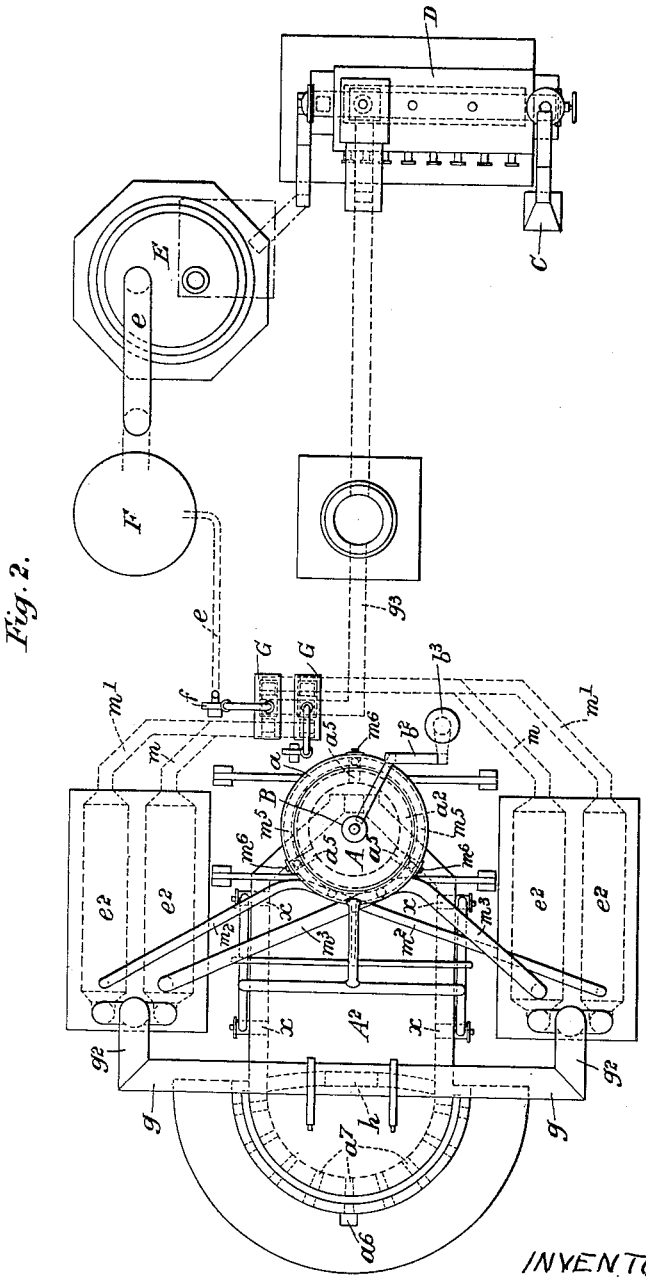
Figure 3:
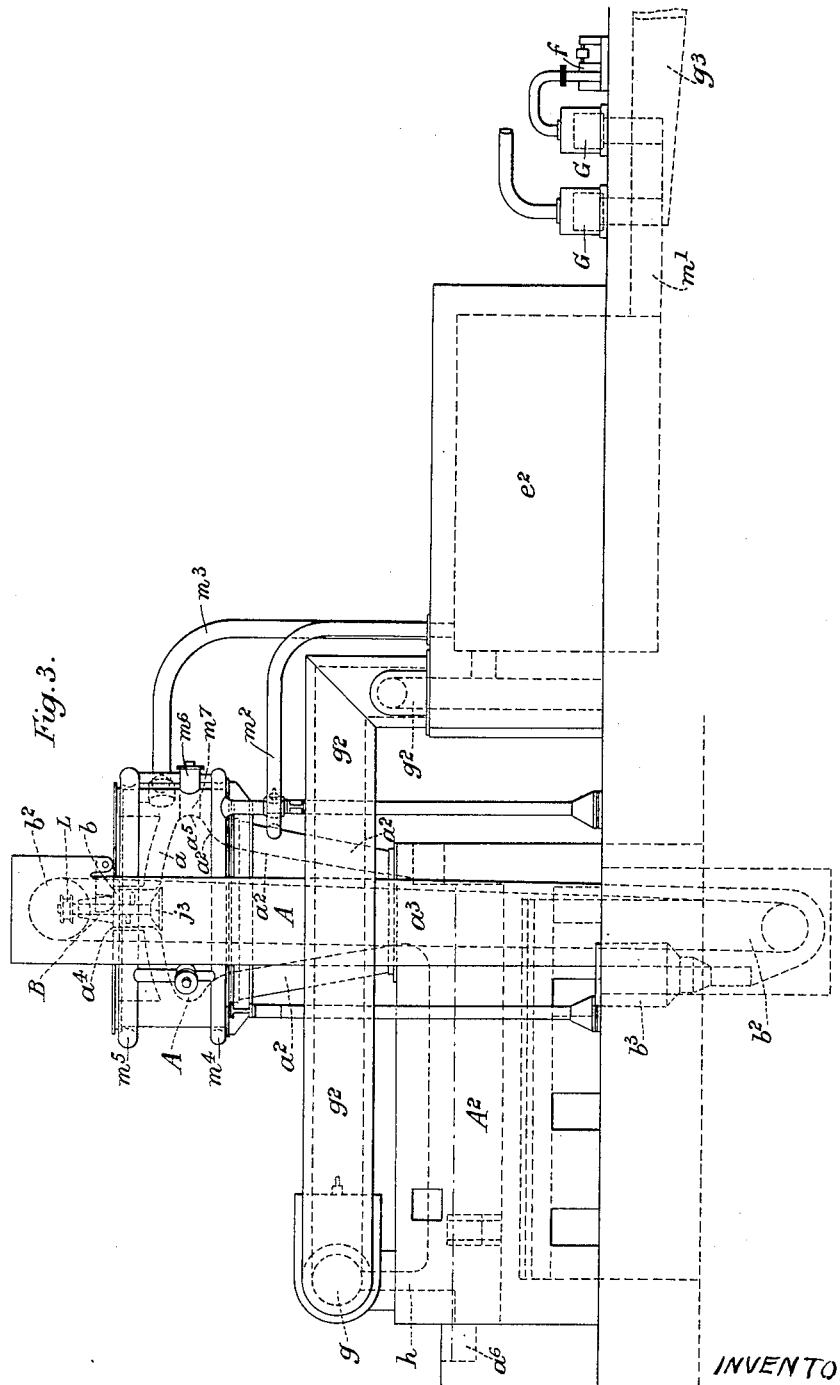

Figure 1 shows in elevation and Fig. 2 in plan, an arrangement according to my invention, in connection with which I have shown a plant for making gas, (for use in the glass-making part of the apparatus) from bituminous fuel, the lighter products being recovered and the heavier products being passed into a gas-producer, the gases produced being passed into the glass-making part of the apparatus. In this arrangement regenerators are shown as being employed and there is also shown a delivery suitable for automatic gathering, or for hand gathering and provided with outside ports. Fig. 3 shows in elevation and Fig. 4 in plan an alternative arrangement with regenerators and without either side ports or hand gathering holes, this being specially suitable for automatic gathering. Figs. 5, 6, 7 and 8 show a modification wherein I employ recuperators and means for preheating the glass-making materials, or one, or more, of them before they are melted, Fig. 5 being an elevation, Fig. 6 a plan, Fig. 7 a vertical section on the line 1—2, Fig. 6 and Fig. 8 a transverse sectional plan on the line 3—4, Fig. 5. This arrangement is especially suitable for automatic gathering. For hand gathering the tank should be wider. In all the figures similar parts are marked with the same letters of reference.

Referring first to Figs. 1 and 2, A is the aforesaid melting chamber, in which the first part of the process according to my invention takes place. The said melting chamber, is of trumpet-like form, with an enlarged upper part and a dome-shaped top $a$ and curved and inclined walls $a^2$ presenting a space contracting in cross-sectional area from the upper part to the lower part and communicating, at $a^3$, with the tank $A^2$, in which the glass produced in the melting chamber A is received and refined by the action of the gases from the melting chamber, which gases pass down with the melted glass from the melting chamber into the said tank $A^2$ from which the refined glass passes to any suitable working holes, or other places, at which the produced glass is withdrawn as required.

I have shown at $x$, $x$, openings by which a portion of the gas and the necessary air for its combustion can, if desired, be admitted to assist the refining of the glass in the tank $A^2$.

The gas and air are forced, at $a^5$, $a^5$, (shown more clearly in Fig. 8) through valves $m^6$, $m^6$, and combustion tubes $m^7$ into the large space of the melting chamber A in a tangential direction, as aforesaid, so as to cause a whirling action upon the particles of glass-making materials which are admitted at $a^4$ through a valve $b$ beneath an inlet B to which the glass-making materials in the requisite relative proportions are supplied in any suitable manner such as by an elevator $b^2$, the said materials being acted upon by the mixing device $b^4$ so that, as they enter the melting chamber A, they are distributed by a spreader $j^3$ into the vortex of the whirling gases, from the interior of which vortex the whirling gases draw the particles of glass-making materials into the sphere of action wherein the temperature is maintained at the required degree for the melting of the said glass-making materials, the temperature being in accordance with the nature of the glass to be produced. Under this action the affinities of the glass-making materials reach each other and the dissociation of their particles, or molecules, is brought about and the formation of fresh silicates results, these silicates being either separate silicates, or glasses, or constituting a homogenous glass. These, by the action of the whirling gases, are driven, by centrifugal force, away from the center of the vortex in the melting chamber, the walls of which chamber are shaped to conform to the known form taken by fluids in whirling movement. The large space at the top of the melting chamber is such as to allow of the proper expansion of the gases due to combustion, which gases, becoming saturated with the falling particles of the glass-making materials have a tendency to lose their temperature and, consequently their volume, as they rotate and pass, in a downward direction, toward the outlet at $a^3$ and the contraction of the melting chamber A, toward its lower end is such as to compensate for this. The heavy, or non-volatile, particles of glass driven into the upper inwardly curved portion of the melting chamber A, drain downward through the decreasing area of the melting chamber until they reach the bottom thereof and drop into the tank $A^2$ below in which the second part of the process according to my invention takes place. Immediately on reaching the tank the glass as it flows passes therealong and is subjected therein to the continued heat radiation and refining action of the gases from the melting chamber above and passes over the glass as it flows through the said tank toward the outlet $a^6$ therefrom, for automatic gathering, or to the outlets $a^7$ $a^7$ for hand gathering.

I have shown, in Figs. 1 and 2, in connection with the apparatus in accordance with my invention, an arrangement which may be used to produce gas for use in the melting chamber A, and afterward in the tank $A^2$, although gas produced in any other suitable way may be employed. C is an elevator by which coal is supplied to a retort D the gaseous products from which can be separated by fractional distillation, the lighter portions being carried off for use for any required purpose and the heavier portions being passed into a gas-producer E, the gas from which is conducted by the pipes $e$, through any suitable valves at G, to the regenerators $e^2$ and thence to the melting chamber, A and forcibly passed thereinto at $a^5$ $a^5$ by a fan in any suitable position (one is indicated at $f$) or by, or in addition to, any other suitable forcing device such, for instance, as a weighted bell of a gasometer shown at F, the regenerators being operated in any convenient, or ordinary, manner of working regenerators.

Figure 4:
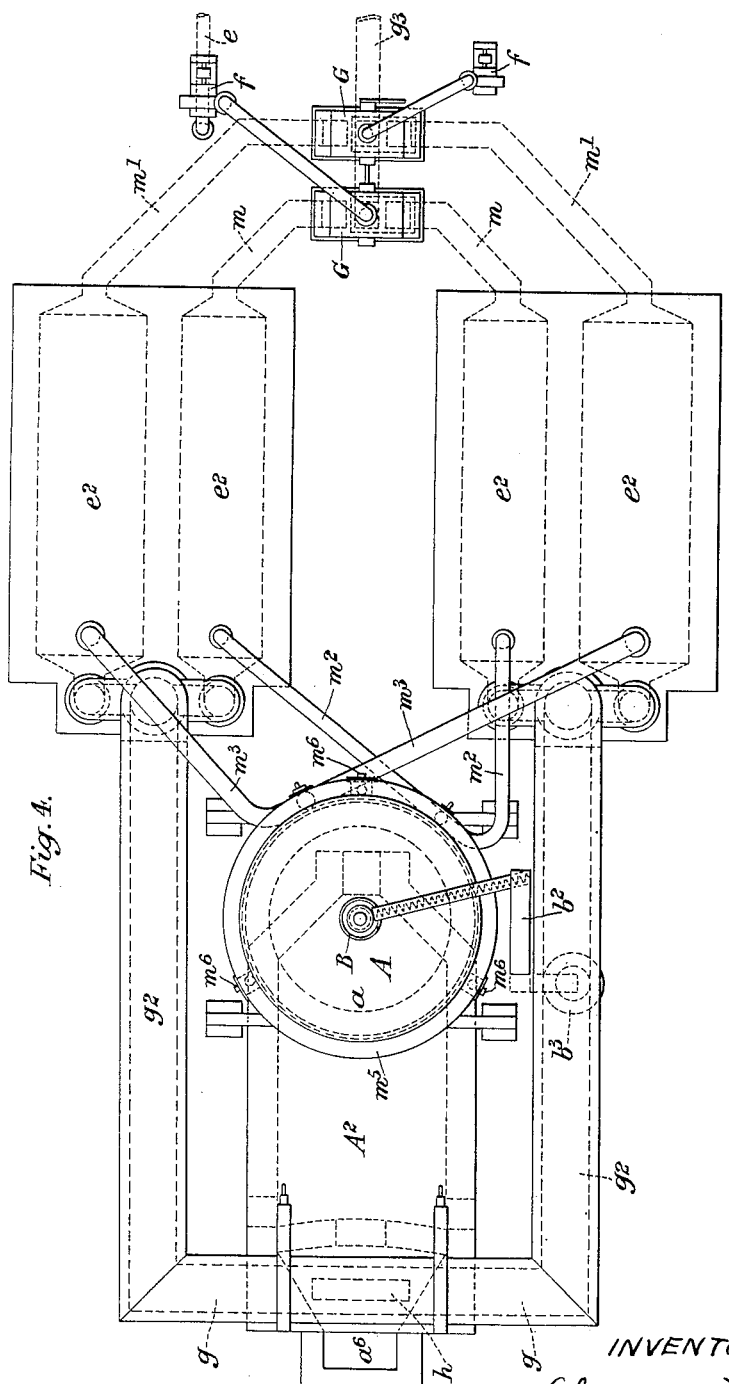
Figure 5:
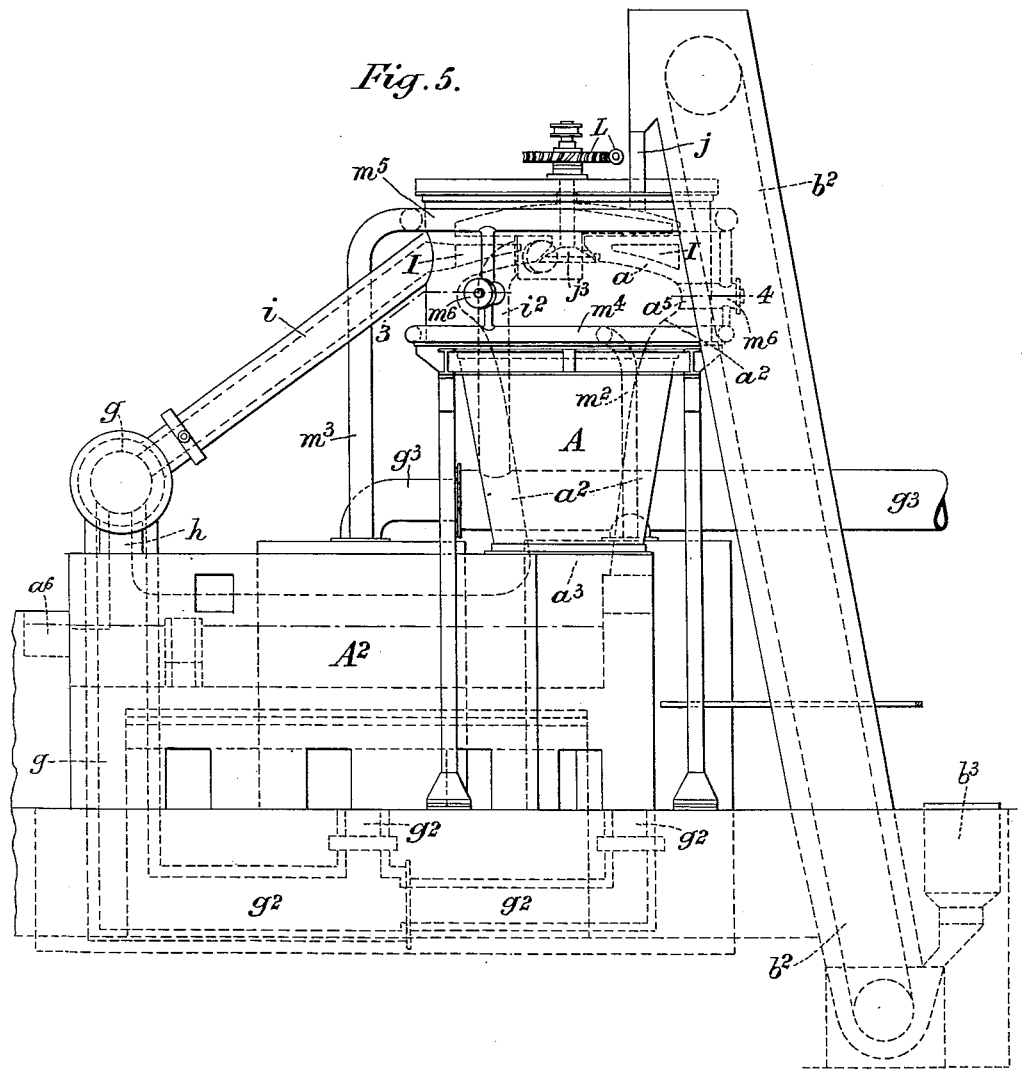
Figure 6:
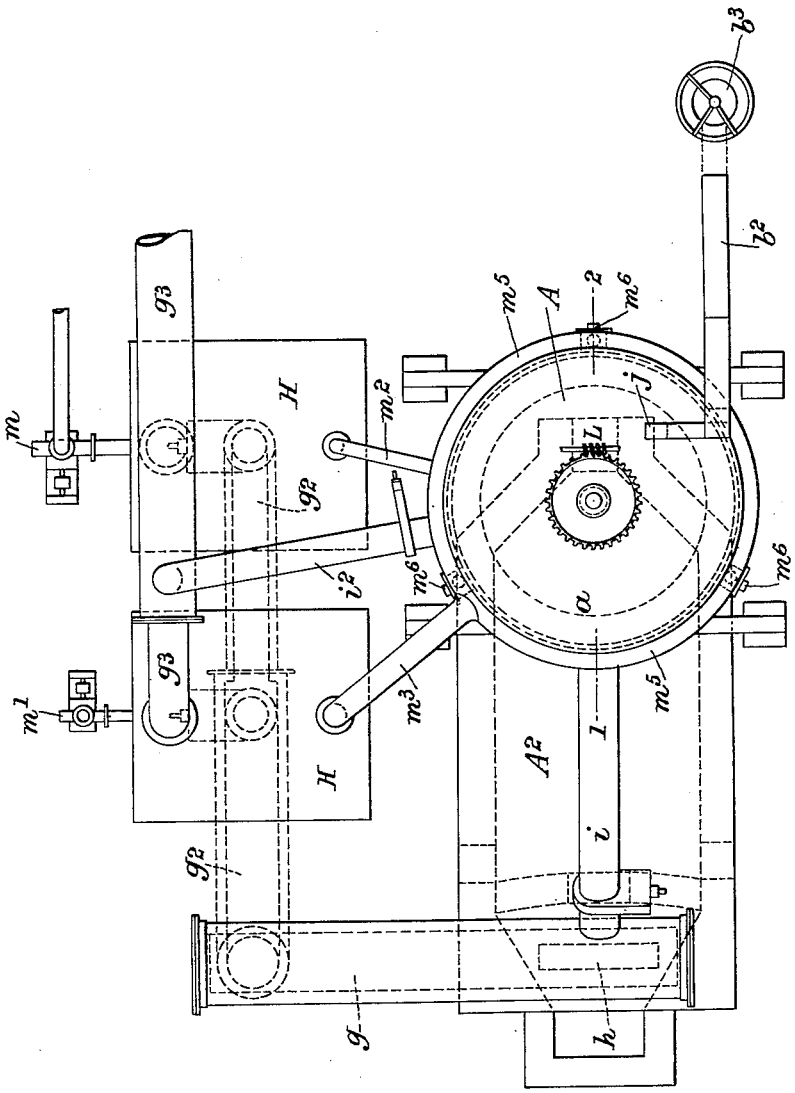
Figure 7:
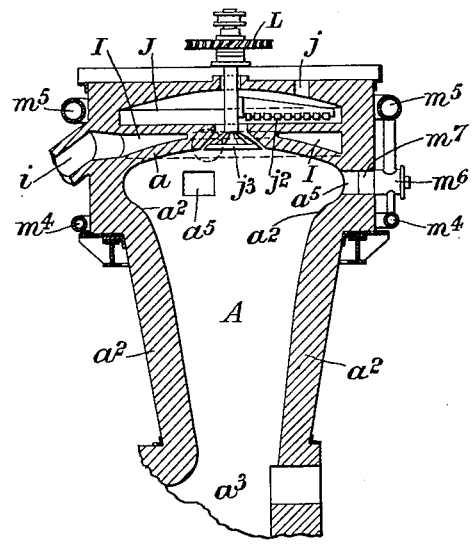
Figure 8:
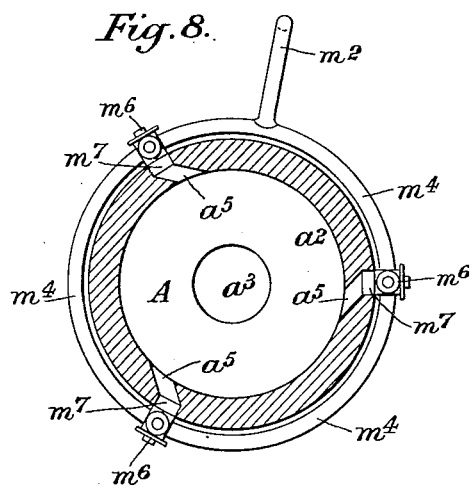

In the arrangement shown in Figs. 3 and 4 the regenerators $e^2$ are situated between the gas and air valve G, G, and the tank $A^2$ so that, in large installations, they form a battery of regenerators in the same way as is usual in producer gas batteries, this permits of the tanks, regenerators and producers each being in line which facilitates supervision and economizes labor.

If it be preferred to preheat either, or any, of the glass-making materials, before they enter the melting chamber, A, to be acted upon by the whirling and melting action of the hot gases I can effect this, or assist the effecting of this, by the otherwise waste heat of the gases after they have fulfilled their glass-making in the furnace A and subsequently their refining, or finishing functions in the tank $A^2$ and further I can also, if desired, utilize a portion of the otherwise waste gases for preheating the gas and air for combustion in the melting chamber, A. Figs. 5, 6, 7 and 8 show a construction according to my invention to effect such preheating and utilization of otherwise waste heat, the example showing an arrangement wherein the otherwise waste gases are utilized to preheat both the said glass-making materials and the ingoing gas and air for combustion in the melting chamber, A, but it will be understood that, if desired, any, or all, of the glass-making materials alone, or the gas and air only, may be preheated by such gases.

The apparatus according to this modification is provided with means whereby the gases from the tank $A^2$ are conducted through an uptake $h$ and, in part, to recuperators H, H, through the flues $g$ $g^2$ $g^2$ and thence through the pipes inside the recuperators and out therefrom by the flue $g^3$ to the chimney. The other portion of the otherwise waste gases passes from the flue $g$ by the pipe $i$ into a chamber I formed above the roof $a$ of the melting chamber, A, and thence by the pipe $i^2$, to the chimney by the flue $g^3$ and thus pre-heats a chamber J above the chamber I into which the glass-making material, or materials, which it is desired to preheat is, or are, admitted by an opening $j$, it, or they, being supplied by an elevator $b^2$ from a measuring receptacle $b^3$. The chamber I may be provided with any suitable means, such for instance as a partition, which will insure the proper passage of the gases, through the said chamber, from the inlet pipe $i$ to the outlet pipe $i^2$. The chamber J is provided with a stirrer $j^2$ and has, at its entrance to the melting chamber, A, a distributer $j^3$ the said stirrer and distributer being both rotated by any suitable gear, such, for instance, as the worm-gear shown at L. The air and gas for use in the melting chamber, A, are passed from the pipes $m$ and $m^1$ through the recuperators H, H, the air then passing by the pipes $m^3$ to the pipes $m^5$ and the gas passing by the pipes $m^2$ to the pipes $m^4$ from which they pass through valves $m^6$ and combustion tubes $m^7$ tangentially at $a^5$ into the upper part of the melting chamber A.

The temperature employed to effect the preheating of the glass-making material, or materials, in the pre-heating chamber J, should, of course, not be high enough to melt such material, or materials, before it, or they, enters, or enter, the melting chamber, A. In place of preheating all the glass-making materials, only that, or those, of the higher melting point, or points, may be preheated and the other, or others, be admitted to the melting chamber, A, without being preheated.

If the heat requirements do not necessitate regeneration, or recuperation, the regenerators $e^2$ shown in the arrangements in Figs. 1 and 2, and in Figs. 3 and 4, can be dispensed with and the pipes $m$, $m$, be connected to the pipes $m^2$, $m^2$, and the pipes $m^1$, $m^1$, be connected to the pipes $m^3$, $m^3$, so that the air and gas enter the melting chamber, A unheated and, after having been utilized in glass-making, pass by the uptake $h$ and pipes $g$, $g^2$, and $g^3$ to the chimney. Further, if desired, the gas regenerators $e^2$, shown in the aforesaid Figs. 1, 2, 3 and 4 may be omitted and the air regenerators alone be utilized in which case the pipes $m^1$, $m^1$, would communicate with the air regenerators $e^2$, $e^2$, and the pipes $m$, $m$, would communicate directly with the pipes $m^2$, $m^2$, so that the hot gases from the producer pass, without super-heating, directly to the melting chamber, A and the cold air is heated by the regenerator before combustion.

Having now particularly described and ascertained the nature of my said invention and in what manner the same is to be performed, I declare that what I claim is:—

1. In the manufacture of glass, the step of subjecting particles of glass-making material to a vortical whirl in the presence of gas at smelting heat and leading the resultant viscous mass and the hot gas downward to a refining tank over the surface of the molten glass in which the gas passes.

2. In the manufacture of glass, the step of pre-heating particles of glass-making material, subjecting said particles to a vortical whirl in the presence of gas at smelting heat, and leading the resultant viscous mass and the hot gas downward to a refining tank over the surface of the molten glass in which the gas passes.

3. In the manufacture of glass, the step of pre-heating particles of glass-making material, subjecting said particles to a vortical whirl in the presence of gas at smelting heat, and leading the resultant viscous mass and the hot gas downward to a refining tank over the surface of the molten glass in which the gas passes, and leading the gas from the refining tank to the pre-heater for the glass-making material.

4. In the manufacture of glass, the step of subjecting particles of glass-making material to a vortical whirl in the presence of gas at smelting heat and leading the resultant viscous mass and the hot gas downward to a refining tank over the surface of the molten glass in which the gas passes, and leading the gas from the refining tank to a pre-heater for the fresh gas with which the glass-making material is mingled at smelting temperature.

5. An apparatus for the manufacture of glass, comprising a melting chamber, a refining tank to which the bottom of the melting chamber opens, means for introducing particles of glass-making material into the upper portion of the melting chamber, and means for directing gases of combustion into said upper portion of the melting chamber in a direction to establish therein a vortical whirl in which the particles of glass-making material are received, and an outlet from the space above the refining tank for the combustion gases passing from the melting chamber over the molten glass in the tank.

In testimony whereof I have signed my name to this specification in the presence of two subscribing witnesses.

ALEXANDER FERGUSON.

Witnesses:
G. F. TYSON,
EDW. GEO. DAVIS.